United States Patent Office 3,651,076
Patented Mar. 21, 1972

3,651,076
SULFUR COMPOUNDS AND METHODS FOR THEIR PRODUCTION
Roger D. Westland, Ann Arbor, Mich., assignor to Parke, Davis & Company, Detroit, Mich.
No Drawing. Filed Aug. 7, 1969, Ser. No. 848,343
Int. Cl. C07d 91/34
U.S. Cl. 260—306.8 R       5 Claims

ABSTRACT OF THE DISCLOSURE

3-[(2-mercaptoethyl)amino] - N - 2-thiazolylpropionamide, 3,3'-[dithiobis(ethyleneimino)]bis[N-2-thiazolylpropionamide], and their acid-addition salts, useful as schistosomacides, and their production by (1) reaction of N-2-thiazolyl-1-ethyleneiminopropionamide with hydrogen sulfide to produce the thiol product and (2) reaction of the thiol product with an oxidizing agent to produce the disulfide product.

SUMMARY AND DETAILED DESCRIPTION

The present invention relates to new organic sulfur compounds that are useful as chemotherapeutic agents and to methods for their production. More particularly, the invention relates to 3-[(2-mercaptoethyl)amino]-N-2-thiazolylpropionamide, which in free base form is represented by the formula

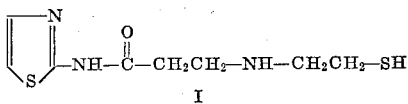

I to 3,3'-[dithiobis(ethyleneimino)]bis[N - 2-thiazolylpropionamide], which in free base form is represented by the formula

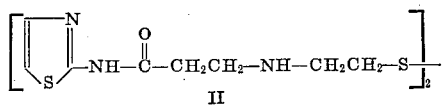

II and to acid-addition salts of the foregoing compounds.

In accordance with the invention, 3-[(2-mercaptoethyl)amino]-N-2-thiazolylpropionamide and salts thereof are produced by reacting N-2-thiazolyl-1-ethyleneiminopropionamide, which has the formula

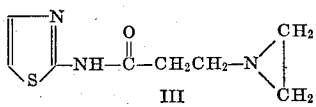

III with hydrogen sulfide. The reaction is best carried out in an unreactive solvent medium. Suitable solvents for this purpose include various lower alkanols, aliphatic ethers, tertiary amides, and aromatic hydrocarbons. A preferred solvent is a lower alkanol, especially methanol or ethanol. The reaction can be carried out over a wide range of temperatures, from −65° to +35° C., and at a temperature in this range is essentially complete after a period of from 30 minutes to about 3–4 hours. Although equivalent quantities of reactants may be employed, best results are obtained when at least a twofold excess of hydrogen sulfide is used. The product of the reaction may be isolated in the free base form having Formula I above or in the form of an acid-addition salt by appropriate adjustment of the pH as desired.

The N-2-thiazolyl-1-ethyleneiminopropionamide that is used in the foregoing process as a starting material is prepared by reacting 3-chloro-N-2-thiazolylpropionamide with ethyleneimine in the presence of a base.

Also in accordance with the invention, 3,3'-[dithio-bis(ethyleneimino)]bis[N - 2 - thiazolylpropionamide] and salts thereof are produced by reacting 3-[(2-mercaptoethyl)amino]-N-2-thiazolylpropionamide with an oxidizing agent. Suitable oxidizing agents include hydrogen peroxide, iodine, the hypochlorite ion, and diethyl azodicarboxylate. Air and oxygen may also be used as oxidizing agents in the presence of a catalyst such as ferric chloride or cupric chloride. The preferred oxidizing agent is hydrogen peroxide. Any of a number of solvents may be used, including water, lower alkanols, various ethers, tertiary amides, and aromatic hydrocarbons. A preferred solvent is an aqueous lower alkanol. The temperature of the oxidation reaction is not especially critical and may be varied from −65° to +35° C. It is most convenient to carry out the reaction at room temperature, and at that temperature, the reaction is essentially complete after a period of from 10 minutes to about 3 hours. With the preferred hydrogen peroxide oxidizing agent, approximately equivalent quantities of reactants are used. When one of the milder oxidizing agents mentioned above is used, it is preferably employed in moderate excess. The disulfide product of the oxidation can be isolated directly in the free base form having Formula II above or in the form of an acid-addition salt by appropriate adjustment of the pH as desired.

3-[(2 - mercaptoethyl)amino] - N - 2 - thiazolylpropionamide and 3,3'-[dithiobis(ethyleneimino)]bis[N-2-thiazolylpropionamide] can exist either in the free base form represented by Formulas I and II respectively or in the form of an acid-addition salt formed with any of a number of inorganic and organic acids. Pharmaceutically-acceptable acid-addition salts can be formed by reaction with such acids as hydrochloric, hydrobromic, hydriodic, sulfamic, benzenesulfonic, p-toluenesulfonic, citric, and succinic. A preferred acid-addition salt is the hydrochloride because of its ease of preparation. The acid-addition salts differ from the free base compounds with respect to certain physical properties such as solubility in polar solvents but are otherwise equivalent for the purposes of the invention.

The compounds of the invention are new chemical compounds that are useful as chemotherapeutic agents, especially as anti-parasitic agents that are active schistosomacides. Their activity in this regard can be demonstrated and quantitatively measured in a standard test against *Schistosoma mansoni* in mice, which is carried out as described in American Journal of Tropical Medicine and Hygiene, vol. 11, No. 1, pages 31–45, January 1962. The results obtained in this test for the compounds of the present invention are summarized in the following table.

SCHISTOSOMACIDAL ACTIVITY

Compound A: 3-[(2-mercaptoethyl)amino]-N-2-thiazolylpropionamide.
Compound B: 3,3'-[dithiobis(ethyleneimino)]bis-[N-2-thiazolylpropionamide].

| | Dose (mg./kg./day)/ (days) | Number of mice treated | Reduction in live worm burden, percent |
|---|---|---|---|
| Compound: | | | |
| A [1] | 296/14 | 6 | 75.6 |
| B [2] | 400/5 | 8 | 92.4 |

[1] Administered as the monohydrochloride salt in the diet at a concentration of 0.25%.
[2] Administered by gavage as an aqueous suspension.

The invention is illustrated by the following examples.

Example 1

To a mixture of 5.0 g. of N-2-thiazolyl-1-ethyleneiminopropionamide and 20 ml. of absolute ethanol cooled in a Dry Ice-acetone bath is added a solution of approximately 2.5 g. of hydrogen sulfide in 30 ml. of absolute ethanol cooled to −65° C. The resulting reaction mixture is allowed to warm to room temperature, is kept at that temperature for 3 hours, and is then evaporated under reduced pressure below 25° C. to give a solid residue of 3 - [(2 - mercaptoethyl)amino] - N - 2-thiazolylpropionamide. This solid product is dissolved in 2-propanol, the resulting solution is treated with 6.2 ml. of a solution of hydrogen chloride in 2-propanol (4 N), and the solid 3 - [(2 - mercaptoethyl)amino] - N-2-thiazolylpropionamide monohydrochloride that precipitates is isolated and purified by crystallization twice from 250 ml. of methanol; M.P. 200–201° C. (with decomposition).

The N-2-thiazolyl-1-ethyleneiminopropionamide starting material is obtained as follows. To a mixture of 7.2 g. of powdered anhydrous potassium carbonate and 100 ml. of ethyleneimine cooled in an ice-bath is added 10.0 g. of 3-chloro-N-2-thiazolylpropionamide. The cooling bath is then removed, whereupon the reaction temperature rises spontaneously to about 40° C. Upon cooling again to room temperature, the mixture is concentrated, and the solid residue obtained is extracted 4 times with boiling benzene. The combined extracts are filtered through diatomaceous silica, and the filtrate is concentrated to a volume of about 100 ml. The solid that precipitates is isolated by filtration, and the filtrate is again concentrated to yield additional solid. The combined solids are then crystallized from benzene to give the desired N-2-thiazolyl-1-ethyleneiminopropionamide; M.P. 145–147.5° C.

Example 2

To a mixture of 10 g. of N-2-thiazolyl-1-ethyleneiminopropionamide and 50 ml. of anhydrous methanol cooled in a Dry Ice-acetone bath is added a solution of approximately 5 g. of hydrogen sulfide in 100 ml. of methanol cooled to −45° C. The resulting reaction mixture is allowed to warm to room temperature and is filtered to remove any insoluble solid. The filtrate is concentrated under reduced pressure for 15 minutes without external heating, and the concentrate is filtered by gravity to remove the precipitated solid. To the clear filtrate is added 2.5 ml. of 30% hydrogen peroxide, and the resulting mixture is kept undisturbed at room temperature for 30 minutes. The supernatant liquid is then carefully decanted and set aside, and the crystalline solid product, which is 3,3' - [dithiobis(ethyleneimino)]bis[N - 2 - thiazolylpropionamide], is collected, washed with methanol, and dried under reduced pressure over phosphorus pentoxide; M.P. 67–75° C. To the supernatant liquid set aside earlier is added 8.5 ml. of a solution of hydrogen chloride in 2-propanol (4 N), and the solid 3,3'-[dithiobis(ethyleneimino)]bis[N-2-thiazolylpropionamide] dihydrochloride that precipitates is isolated, washed with absolute ethanol, and dried under reduced pressure; M.P. 195–198° C. (with decomposition).

I claim:

1. A member of the class consisting of 3-[(2-mercaptoethyl)amino]-N-2-thiazolylpropionamide, which in free base form is represented by the formula

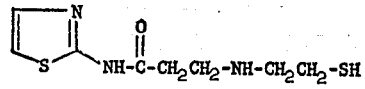

3,3' - [dithiobis(ethyleneimino)]bis[N - 2 - thiazolylpropionamide], which in free base form is represented by the formula

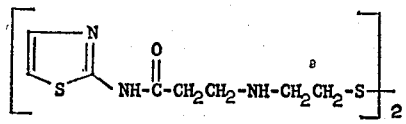

and pharmaceutically-acceptable acid-addition salts of the foregoing compounds.

2. A compound according to claim 1 which is 3-[(2-mercaptoethyl)amino]-N-2-thiazolylpropionamide.

3. A compound according to claim 1 which is 3-[(2-mercaptoethyl)amino] - N - 2 - thiazolylpropionamide monohydrochloride.

4. A compound according to claim 1 which is 3,3'-[dithiobis(ethyleneimino)]bis[N - 2 - thiazolylpropionamide].

5. A compound according to claim 1 which is 3,3'-[dithiobis(ethyleneimino)]bis[N - 2 - thiazolylpropionamide]dihydrochloride.

References Cited

UNITED STATES PATENTS 3,124,588   3/1964   Reisner et al. _____ 260—306.8

ALEX MAZEL, Primary Examiner

R. J. GALLAGHER, Assistant Examiner

U.S. Cl. X.R.

424—270